United States Patent [19]

Nakatsu et al.

[11] Patent Number: 5,547,505
[45] Date of Patent: Aug. 20, 1996

[54] COMPOSITIONS FOR LOW HEAT CEMENTS

[75] Inventors: Kazuya Nakatsu, Fukuoka; Takaharu Goto, Ichikawa; Toru Higaki, Tokyo; Hideki Endo, Funabashi; Satoru Hirose, Tokyo; Yukinori Yamazaki, Ichikawa, all of Japan

[73] Assignee: Nihon Cement Co., Ltd., Tokyo, Japan

[21] Appl. No.: 452,644

[22] Filed: May 25, 1995

Related U.S. Application Data

[63] Continuation of Ser. No. 119,177, filed as PCT/JP92/00430, Jul. 4, 1992, published as WO92/18434 Oct. 29, 1992, abandoned.

[30] Foreign Application Priority Data

Apr. 9, 1971 [JP] Japan ................................. 3-161975
Oct. 11, 1991 [JP] Japan ................................. 3-329423

[51] Int. Cl.⁶ ............................................. C04B 7/02
[52] U.S. Cl. ........................... 106/713; 106/714; 106/715; 106/737; 106/788; 106/789; 106/791; 106/796
[58] Field of Search ........................ 106/713, 715, 106/721, 722, 737, 738, 781, 788, 796, 714, 789, 791

[56] References Cited

U.S. PATENT DOCUMENTS 3,501,324 3/1970 Kubo ................................. 106/796

FOREIGN PATENT DOCUMENTS

| 766032 | 9/1971 | Belgium . |
| 824788 | 5/1975 | Belgium . |
| 0019338 | 11/1980 | European Pat. Off. . |
| 0139632 | 12/1978 | Japan ................................. 106/796 |
| 2120161 | 8/1990 | Japan . |
| 0698936 | 11/1979 | U.S.S.R. ................................. 106/715 |
| 1556788 | 11/1979 | United Kingdom . |

*Primary Examiner*—Paul Marcantoni
*Attorney, Agent, or Firm*—McAulay Fisher Nissen Goldberg & Kiel, LLP

[57] ABSTRACT

Compositions for low heat cements developed especially for massive concrete works and which exhibit a compressive strength/heat of hydration ratio of at least 7.0 at the age of 13 weeks. One of two inventions provides a powder prepared by mixing CaO, $SiO_2$, and $Al_2O_3$ materials, melting the mixture, quenching the melt, and grinding the quenched matter, the powder being composed mainly of amorphous substances and chemically having a $CaO/SiO_2$ (molar ratio) of 0.8–1.5 and an $Al_2O_3$ content of no more than 10 wt. %. The other invention provides a mixed powder comprising no less than 70 wt. % of a powder and no more than 30 wt. % of an addition (portland cement or the like), the powder being the same as that of the first invention in both predominance of amorphous substances and $CaO/SiO_2$ (molar ratio) excepting the $Al_2O_3$ content which is less than 12 wt. % in the second invention.

14 Claims, No Drawings

COMPOSITIONS FOR LOW HEAT CEMENTS

This is a continuation of application Ser. No. 08/119,177, filed as PCT/JP92/00430 Jul. 4, 1992, published as WO92/18434 Oct. 29, 1992, now abandoned.

TECHNICAL FIELD

This invention relates to a composition for low heat cement, of a $CaO\text{-}SiO_2\text{-}Al_2O_3$ system in a specific compositional ratio and which is composed mainly of amorphous substances, and relates also to a novel composition for low heat cement prepared by mixing the above composition with an addition or additions.

BACKGROUND ART

Placing concrete for a massive concrete building work, e.g., a dam, footing for a beam of a large bridge, or foundation of a high-rise building, LNG tank, or nuclear power plant, causes the heat of cement hydration to accumulate the concrete being hardened. Thus the temperature inside the mass rises as the concrete hardenes, whereas that of the surface portion remains nearly as low as the ambient temperature. The temperature difference between the two induces a difference in thermal expansion coefficient and hence cracking.

To overcome this difficulty, cements of lower calorific values and processes for producing them have been studied. Some approaches thus far made include changing the proportion of a mineral contained in portland cement (e.g., the choice of dicalcium silicate that slightly generates the heat of hydration as a chief component), altering the particle size distribution in cement, and reducing the water/cement ratio when kneading mortar or concrete on the spot (the textbook for the 249th Concrete Institute Class sponsored by the Cement Association of Japan, pp. 35–43 (1990)).

As compositions of the $CaO\text{-}SiO_2\text{-}Al_2O_3$ system to which the present invention is related, slags and composite cements mixed slag and cement are already known.

A typical piece of the literature pertaining to the subject is the Proceedings of General Meeting/Technical Sessions, C. A. J., vol. 11, pp. 125–133 (1957). The literature states that a cement manufacturer made as samples various composite cements (portland blast-furnace slag cements) of commercially available slag and portland cement in mixing ratios (by weight) of 30–70:70–30, produced mortars using the above composite cements, formed hardened samples from the mortars, measured their compressive strength ($\sigma n$)/heat of hydration (Hn) ratios at the age of 90 days, and obtained values ranging from 5.0 to 6.8. The reference cited concludes that those composite cements were not necessarily of low heat type and that if they were to be comparable in heat of hydration to a moderate heat portland cement it would be appropriate to adjust the proportion of the slag to the composite cement in the range of 50 to 60%.

The slag introduced by the reference is of a common type, with a composition of 38.7–41.9% CaO, 31.8–34.3% $SiO_2$ ($CaO/SiO_2$ (molar ratio)=1.21–1.41), 14.4–19.2% $Al_2O_3$, and the remaining several percent MgO and other impurities.

Another piece of the literature to be cited here is Proceedings of General Meeting/Technical Sessions, C. A. J., vol. 6, pp. 49–56 (1952). According to the publication, varied compositions of the $CaO\text{-}SiO_2\text{-}Al_2O_3$ system are synthesized by melting and quenching raw materials, and slag powders are formed by grinding those compositions to specific surface areas of about 3100 $cm^2/g$. Next, those slag powders and portland cement (addition) are mixed in a ratio by weight of 0.8:0.2 to prepare composite cements. Composites of mortar were made using the composite cements, each in proportions of sand/composite cement=1 and water/composite cement=0.45. Each composite of mortar was molded to form cylindrical pieces of hardened mortar 1 cm in diameter and 2 cm high. The publication shows the compressive strength values of those pieces were determined at the ages of 1 week and 4 weeks. It states, as a conclusion, that an optimum slag composition that exhibits a relatively high compressive strength is 47–52% CaO, 33–37% $SiO_2$ ($CaO/SiO_2$ (molar ratio)=1.36–1.69), and 14–18% $Al_2O_3$. As for the heat of hydration, the literature is silent.

Moderate heat portland cement, one of typical compositions for low heat cement, gives low compressive strength values of 100–200 $kg/cm^2$ and 300–500 $kg/cm^2$ at the ages of 1 week and 13 weeks, respectively, while the hydration heat values are considerably high at 50–70 cal/g and 80–95 cal/g. The compressive strength/heat of hydration ratio at the age of 13 weeks ranges from 3.1 to 6.3.

Thus, when the cement is used for the construction works referred to above, it is customary, after the concrete composite has been placed and hardened, to cool it by water spraying or, alternatively, to place the composite partly, allow it to stand for a period long enough to dissipate the heat out of the hardened concrete mass and lower the internal temperature, and then place a fresh concrete composite to an adjacent space integrally with the pre-placed mass. Either practice has a disadvantage, calling for a watering-cooling step or considerable prolongation of the work period due to the natural cooling.

Among other known cements are composite cements of the portland cement-blast-furnace powder-flyash system and cements based chiefly of dicalcium silicate. Seriously low compressive strength practically bars their use for massive concrete structures; they find use in but small quantities for applications under special conditions.

As stated above, the cements of the prior art have failed to satisfy the both requirements of compressive strength and heat of hydration at extended ages for use in massive concrete construction works. There has been demand, therefore, for a novel cement that will replace the existing ones.

DISCLOSURE OF THE INVENTION

The background art outlined above suggests the importance, for the construction of a massive concrete structure, of a cement both retaining low heat of hydration and exhibiting proper compressive strength for long time. The properties (compressive strength and heat of hydration) of mortar or concrete for general applications can be evaluated at the age of either 1 week or 4 weeks. In the case of a cement for massive concrete, in view of the state of the art described above, its evaluation at such a young age of but 4 weeks or shorter is not appropriate. However, the two properties are closely correlated. For these reasons those properties are best appraised as combined into a single parameter.

Thus, it has been found appropriate to evaluate a cement for massive concrete in terms of its compressive strength/heat of hydration ratio at the age of 13 weeks.

The present inventors have intensively studied on materials, centered around compositions of the $CaO\text{-}SiO_2\text{-}Al_2O_3$ system, that will meet the above requirement, so as to realize the following objects.

It is a primary object of the present invention to develop a cement composition of the $CaO-SiO_2-Al_2O_3$ system, especially one consisting predominantly of amorphous substances in the region where the $Al_2O_3$ content is low, and, moreover, a cement composition improved by combining the materials of the above system with an addition or additions.

Another object is to develop a cement composition which shows a compressive strength/heat of hydration ratio of at least 7.0 at the age of 13 weeks.

The invention will now be described in detail.

The $CaO-SiO_2-Al_2O_3$ composition according to the present invention is slow to hydrate and it exhibits compressive strength and develops heat of hydration for a long period. The composition at the age of 4 weeks is still in the process of reaction, and the maximum compressive strength and hydration heat values can hardly be estimated from measured values at that point. In addition, those measured values are widely scattered and not much reliable with these in view, the evaluation of the two properties of the cement compositions according to the present application was principally based on the measured values on the 13th week.

The first invention of the present application resides in a composition for low heat cement of the $CaO-SiO_2-Al_2O_3$ system composed mostly of amorphous powders in which the $CaO/SiO_2$ (molar ratio) ranges from 0.8 to 1.5 and the $Al_2O_3$ content is between 1.0 and 10.0 wt. %.

So far as the chemical composition is concerned, some of such cement compositions have been synthesized in laboratories and are known in the art. However, the known compositions are markedly low in compressive strength at the age of 4 weeks that they have not been found useful (with their heat of hydration ignored). On this ground whether they can be adapted for massive concrete structures or not has hitherto been left uninvestigated and unknown.

Blast-furnace slag mainly of the $CaO-SiO_2-Al_2O_3$ system that is used as a starting material of composite cement (portland blast-furnace slag cement) is adjusted to contain 14 to 18 wt. % $Al_2O_3$ so as to improve the operation of the blast furnace and increase the purity of the resulting pig iron. Slag with the $Al_2O_3$ content of less than 14 wt. % is not manufactured.

Nevertheless, the present inventors, after extensive investigations with regard to $CaO-SiO_2-Al_2O_3$ compositions, have now found that a properly ground composition in a specific region (i.e., the composition referred to above as the first invention) meets the compressive strength/heat of hydration requirement for the manufacture of massive concrete structures, i.e., low heat of hydration and proper compressive strength at the age of 13 weeks. The first invention is characterized in this respect.

The particular cement composition has been found to be fully of practical use as cement for the above applications.

The compressive strength/heat of hydration ratio at the age of 13 weeks ranges from 7.0 to 15 in the cement compositions according to the invention, whereas the ranges in conventional slags are from 5.0 to 6.8. The values are high enough for the compositions to be used industrially. The values are preferably 8.0 or above, more preferably 10.0 or above.

The composition consists of 85–99.9 wt. % of a powder composition having an amorphous content of 60 wt. %, preferably 80 wt. % or more (hereinafter called the vitrifaction rate).

The portion of the composition other than amorphous contains various minerals. The minerals are impurities in the raw materials used or those which have resulted from variations in the production conditions (melting conditions, cooling rate, etc.). Principal minerals are wollastonite ($CaO \cdot SiO_2$), rankinite ($3CaO \cdot 2SiO_2$), dicalcium silicate ($2CaO \cdot SiO_2$), and gehlenite ($2CaO \cdot Al_2O_3 \cdot SiO_2$). These minerals, which do not hydrate or are extremely slow to undergo the reaction, have little adverse effect of increasing the heat of hydration. In short, they do not lower the compressive strength/heat of hydration ratio.

The chemical composition will be explained below.

A cement composition consists substantially of three compounds, CaO, $SiO_2$, and $Al_2O_3$, the remainder being the impurities originating from the raw materials or resulting from the manufacturing process, etc. as stated above.

If the $CaO/SiO_2$ (molar ratio) is more than 1.5, the melting temperature rises and a cement composition with a large crystalline proportion results even though the melt is quenched in an ice-water bath. The product undesirably has low compressive strength and high heat of hydration. Conversely if the ratio is less than 0.8, the results are again unfavorable in that the hydration of the cement composition becomes extremely slow and the composition exhibits almost no compressive strength, with the compressive strength/heat of hydration ratio declining, although the melting temperature and amorphizing conditions are little influenced. A desirable range is between 0.9 and 1.4, more desirably between 1.0 and 1.3.

As regards the $Al_2O_3$ content, the smaller the better in respect of the heat of hydration but the smaller content is prone to rise the melting temperature of the raw materials and decrease both the proportion of the amorphous substances and the initial strength. An extremely low initial strength is objectionable for the use of the cement composition, because it lowers the strength at the 13th week too, with the consequence that the compressive strength/heat of hydration ratio drops and the frame in which the resulting concrete has been placed cannot be removed for a prolonged period of time. In view of these, an $Al_2O_3$ content of at least 1.0 wt. % is necessary. More than 10.0wt. % $Al_2O_3$ is not appropriate because it sharply reduces both the amorphous proportion and compressive strength. It is important to restrict the $Al_2O_3$ content to no more than 10.0 wt. %, so as to control the heat of hydration, and no less than 1.0 wt. % to allow the composition to exhibit a proper initial strength. The $Al_2O_3$ content ranges desirably from 2.0 to 8.0 wt. %, more desirably from 3.0 to 6.0 wt. %.

The fineness of the cement composition is at least 3000 $cm^2/g$. The finer the composition the better the compressive strength tends to become. The influence upon the heat of hydration is unexpectedly slight. Thus, the use of a fine composition may be advisable depending on the intended use. Excessive fineness is economically unwarranted, however, because it adds to the manufacturing cost. A desirable fineness is between 4000 and 10000 $cm^2/g$.

Next, the process for preparing the cement composition will be explained.

Powders of a CaO material (e.g., limestone), $SiO_2$ material (e.g., silica stone), and $Al_2O_3$ material (e.g., alumina) are mixed to the chemical proportion and composition as specified above. Here the $Al_2O_3$ material is not necessarily used if the CaO and $SiO_2$ materials contain an adequate amount of $Al_2O_3$. The material mixture thus obtained is charged into a conventional melting furnace (e.g., electric furnace), melted thoroughly (to 1350° C. or above), and the melt is thrown into an ice-water bath for quenching and is immediately taken out. This is followed by grinding to a desired fineness by ordinary grinding means (e.g., a ball mill). A composition for low heat cement according to the first invention is thus made.

The second invention of the present application will now be described.

The second invention resides in a composition for low heat cement which comprises a mixture of not less than 70 wt. % of a powder composition of the $CaO-SiO_2-Al_2O_3$ system composed mainly of amorphous substances in which the $CaO/SiO_2$ (molar ratio) ranges from 0.8 to 1.5 and the $Al_2O_3$ content ranges from 1.0 to less than 12.0 wt. %, and not more than 30 wt. % of an addition or additions.

This invention provides a cement composition aimed at accelerating the hydration at the early stage to shorten the setting time and improve the initial strength, while maintaining a low heat of hydration and compressive strength/heat of hydration ratio at the age of 13 weeks. To be more concrete, whereas the cement composition of the first invention has an (initial) setting time of more than 5 hours, the second invention shortens the time by nearly about 2 hours.

In brief, the cement composition of the second invention is an improvement over that of the first invention.

Of the conditions for the powder composition used in the second invention, the fact that the composition consists essentially of the three compounds as described with the first invention, the ranges of the impurities and the $CaO/SiO_2$ (molar ratio), amorphous contents, powder fineness, and manufacturing process are the same as those of the cement composition described under the first invention. The description here, therefore, is limited to that of the $Al_2O_3$ content.

The $Al_2O_3$ content in the powder composition of the second invention may extend to less than 12 wt. % beyond the upper limit in the cement composition of the first invention.

An $Al_2O_3$ content in excess of 12 wt. % is undesirable because the heat of hydration increases, i.e., the compressive strength/heat of hydration ratio decreases. Less than 1.0 wt. % is undesirable too for the reason stated in connection with the first invention. The content is desirably from 2 to 10 wt. %, more desirably from 3 to 8 wt. %.

As for additions, portland cements, gypsums, alkali metal compounds, and alkaline earth metal compounds may be used singly or in a combination of two or more.

Examples are, as portland cements, ordinary, high early strength, and moderate heat portland cements, clinkers, and composite cements (portland blast-furnace slag cements and flyash cements); as gypsums, gypsum dihydrate, hemihydrate and anhydrous gypsums; as alkali metal compounds, sodium hydroxide, sodium carbonate, and potassium hydroxide; and, as alkaline earth metal compounds, calcium hydroxide and calcium oxide. A desirable addition is ordinary portland cement.

In the mixture of a powder composition and an addition, a proportion of the addition exceeding 30 wt. % (on the basis of the total weight of the mixture) is not desired since it raises the heat of hydration and therefore reduces the compressive strength/heat of hydration ratio. A desirable proportion of the addition is between 0.1 and 15 wt. %. Where a gypsum is employed as the addition, the recommended amount ranges from 0.1 to 5.0 wt. % as $SO_3$.

The powder composition and the addition may be mixed by using a conventional mixing method, which is not specially limited under the present application.

The low heat cements according to the first and second inventions may contain commercially available slag, flyash, pozzolan, limestone, silica stone and other powders unless they act contrary to the purposes of the inventions.

To sum up, the two cement compositions and their advantageous effects are as follows.

The first invention is an invention of a cement composition comprising CaO, $SiO_2$, and $Al_2O_3$ as chief components and based on amorphous substances, with the $CaO/SiO_2$ (molar ratio), the $Al_2O_3$ content, etc. in specified ranges. The second invention is an invention of a cement composition which may well be called an improvement over the first invention in that it comprises a mixture of an addition or additions and a powder composition whose $Al_2O_3$ content ranges from the level of the first invention to a value 2 wt. % larger than that level.

These cement compositions form novel cements developed with the view of attaining proper compressive strength and heat of hydration for long time, especially a proper compressive strength/heat of hydration ratio at the age of 13 weeks, of the $CaO-SiO_2-Al_2O_3$ compositions of the compositional ranges that have been neglected by reason of poor hydraulic properties, so that the products can be used for massive concrete structures.

They fully satisfy the conditions required of massive concrete structures. The introduction of these cement composition is a great boon to the construction industry for which cement is a vital construction material.

With the inventions of the present application it is to be noted also that hardened masses of the above cement compositions form wollastonite upon heating (around 900° C.) and become more resistant to heat than hardened masses of ordinary portland cements. Moreover, the low CaO contents in the cement compositions of the present application, about 20 wt. % less than those of ordinary portland cements, produce the following secondary beneficial effects: (1) The $CO_2$ gas to be exhausted from the process of producing the cement compositions are smaller in volume; and (2) the cement compositions are useful as cements for fiber-reinforced concrete (GRC) that has posed a deterioration problem attributable to the CaO contents in conventional cements.

Now the inventions will be illustrated by the following examples.

Best Mode for Carrying Out the Invention

EXAMPLE 1

Various powders differing in $CaO/SiO_2$ (molar ratio) were prepared and their three properties to be described below were determined.

Starting materials used were as follows:

- CaO material:- "Calcium carbonate", purity 99.8 wt. %, specific surface area 4030 cm²/g, produced by Hakushin Chemical Laboratory Co., Ltd.
- $SiO_2$ material:- "Hisilica FS-i", purity 99.6 wt. %, average particle diameter 4.2 μm, produced by Nitchitsu Co., Ltd.
- $Al_2O_3$ material:- "Fine-particle alumina Al-45-H", purity 99.9 wt. %, average particle diameter 3.0 gm, produced by Showa Denko K.K.

First, the CaO and $SiO_2$ materials were mixed in the $CaO/SiO_2$ (molar ratios) shown in Table 1. The resulting mixtures were mixed with the $Al_2O_3$ material so that the $Al_2O_3$ content in each mixture was 8.0 wt. %. Polybutyl alcohol was added as a binder and ethyl alcohol as a solvent, and each mixtures was pelletized into pellets ranging in diameter from 5 to 10 mm.

The pellets were dried and calcined at 1000° C. for 3 hours. Following this, they were melted in an electric furnace by heating at 1750° C. for 30 minutes. The melt was thrown into an ice-water bath for quenching and immediately taken out. In Table 1, the melt of Exp. No. 4 was allowed to cool in air.

The quenched matter thus obtained was ground on an iron ball mill to a powder having a specific surface area of 5000±100 cm²/g.

The percentage of the amorphous substances in each powder was measured by X-ray diffraction (XRD) analysis and microscopic observation, the value being given as the "rate of vitrifaction". Compressive strength and heat of hydration were determined by the methods prescribed in the Japanese Industrial Standards (JIS). The determination of the compressive strength conformed specifically to JIS R-5201 (Physical testing methods for cements). A composite of mortar was prepared by kneading 520 parts by weight of each test powder, 1040 parts by weight of standard sand, and 338 parts by weight of water (water/cement ratio=0.65). The composite was formed into blocks measuring 4 by 4 by 16 cm, and the test specimens so obtained were tested according to the age of hardened concrete as shown in Table 1.

Setting time tests too were conducted in conformity with JIS R-5201, and the time was measured with paste.

Heat of hydration was determined with a paste obtained by kneading 100 parts by weight of each test powder with 50 parts by weight of water for 3 minutes, in conformity with JIS R-5203 "Testing Method for Heat of Hydration of Cements (Heat of Solution)".

The results of various measurements are given in Table 1. Compressive strength/heat of hydration ratio and the hydration heat values estimated on condition of constant compressive strength (300 kgf/cm²) are shown in Table 2. The present invention is represented by Experiment Nos. 3 to 6.

TABLE 1

| Exp. No. | Composition $CaO/SiO_2$ (molar ratio) | Specific gravity | Vitrifaction rate (%) | Compressive Str. (kgf/cm²) 1 W | 4 W | 13 W |
|---|---|---|---|---|---|---|
| 1 | 0.30 | — | — | (materials unmelted) | | |
| 2 | 0.50 | 2.84 | 79.5 | not hardened | | |
| 3 | 0.80 | 2.92 | 82.5 | 80 | 204 | 441 |
| 4 | 1.20 | — | 52.5 | 85 | 152 | 320 |
| 5 | 1.20 | 2.94 | 99.0 | 92 | 228 | 380 |
| 6 | 1.50 | 2.96 | 80.2 | 95 | 202 | 373 |
| 7 | 1.80 | — | — | (materials unmelted) | | |
| 8 | Moderate heat portland cement | | | 195 | 335 | 493 |

| Exp. No. | Heat of hydration (cal/g) 1 W | 4 W | 13 W | Setting time (hr–min) Initial | Final |
|---|---|---|---|---|---|
| 1 | — | — | — | — | — |
| 2 | — | — | — | — | — |
| 3 | 18.0 | 24.7 | 29.4 | 5–48 | 9–12 |
| 4 | 18.6 | 22.8 | 33.0 | 5–54 | 9–16 |
| 5 | 21.5 | 33.6 | 35.9 | 5–37 | 9–58 |
| 6 | 30.8 | 40.5 | 45.6 | 5–39 | 9–46 |
| 7 | — | — | — | — | — |
| 8 | 55.1 | 70.4 | 81.4 | 2–46 | 5–21 |

TABLE 2

| Experiment No. | 1 | 2 | 3 | 4 | 5 | 6 | 7 | 8 |
|---|---|---|---|---|---|---|---|---|
| Estimated heat of hydration (cal/g) | — | — | 26.6 | 31.8 | 34.7 | 43.4 | — | 66.8 |
| Compressive str./heat of hydration (13 W) | — | — | 15.0 | 9.7 | 10.6 | 8.2 | — | 6.1 |

EXAMPLE 2

Powders with varying $Al_2O_3$ contents were prepared and their properties investigated.

In preparing and testing those powders, the procedure of Example 1 was repeated with the exception that the CaO and $SiO_2$ materials were mixed so that the $CaO/SiO_2$ (molar ratio) was kept constant at 1.20 and the $Al_2O_3$ material was mixed so that the $Al_2O_3$ content in each mixture was kept in proportions shown in Table 3. The results are shown in Tables 3 and 4.

The present invention is represented by Experiment Nos. 9 to 11.

TABLE 3

| Exp. No. | Composition $Al_2O_3$ (wt %) | Specific gravity | Vitrifaction rate (%) | Compressive Str. (kgf/cm²) 1 W | 4 W | 13 W |
|---|---|---|---|---|---|---|
| 9 | 1.0 | 2.94 | 99.3 | 83 | 203 | 432 |
| 10 | 6.0 | 2.96 | 99.9 | 85 | 204 | 440 |
| 11 | 10.0 | 2.97 | 98.5 | 92 | 198 | 370 |
| 12 | 12.0 | 2.98 | 98.5 | not hardened | | |

| Exp. No. | Heat of hydration (cal/g) 1 W | 4 W | 13 W | Setting time (hr–min) Initial | Final |
|---|---|---|---|---|---|
| 9 | 17.8 | 24.8 | 29.1 | 5–42 | 9–11 |
| 10 | 18.6 | 31.8 | 37.9 | 5–48 | 9–15 |
| 11 | 21.5 | 33.6 | 38.9 | 5–39 | 9–07 |
| 12 | — | — | — | — | — |

TABLE 4

| Experiment No. | 9 | 10 | 11 | 12 |
|---|---|---|---|---|
| Estimated heat of hydration (cal/g) | 26.6 | 34.3 | 36.7 | — |
| Compressive str./heat of hydration (13 W) | 14.8 | 11.6 | 9.5 | — |

EXAMPLE 3

Influences of additions were confirmed by experiments to be described below.

A powder composition was chosen which was a portion of the quenched material obtained as Experiment No. 5 in Example 1 and ground to have a specific surface area of 4660 cm$^2$/g. The powder had a CaO/SiO$_2$ (molar ratio) of 1.20 and an Al$_2$O$_3$ content of 8.0 wt. %.

As additions, the following were employed:

- Ordinary portland cement, produced by Nihon Cement Co., 3250 cm$^2$/g.
- Calcium hydroxide, produced by Okutama Co., Ltd., special grade slaked lime, 12000 cm$^2$/g.
- Anhydrous gypsum, produced by Kanto Chemicals Co., Ltd., prepared by heat-treating a special grade reagent calcium sulfate at 600° C. for one hour and then grinding to powder, 10000 cm$^2$/g.
- Sodium carbonate, produced by Kanto Chemicals Co., Ltd., a special grade reagent powder.

The powder composition and the individual additions were thoroughly mixed by mixers in proportions (inner percentage) shown in Table 5 to prepare cement compositions. Their properties were measured generally in conformity with the procedure of Example 1. The results are given in Tables 5 and 6. The proportion of anhydrous gypsum is given as that of SO$_3$ and the proportion of sodium carbonate as Na$_2$O.

TABLE 5

| | Addition | | Compressive Str. (kgf/cm$^2$) | | |
|---|---|---|---|---|---|
| Exp. No. | Type | (%) | 1 W | 4 W | 13 W |
| 13 | Ordinary portland | 5 | 93 | 312 | 420 |
| 14 | cement | 10 | 93 | 333 | 530 |
| 15 | | 20 | 106 | 336 | 559 |
| 16 | | 30 | 127 | 372 | 571 |
| 17 | | 40 | 159 | 408 | 588 |
| 18 | Calcium hydroxide | 5 | 90 | 325 | 415 |
| 19 | Anhydrous gypsum | 5 | 91 | 309 | 400 |
| 20 | Sodium carbonate | 1 | 129 | 323 | 396 |
| 21 | Moderate heat portland cement | | 198 | 335 | 493 |
| 22 | Ordinary portland cement | | 245 | 407 | 476 |

TABLE 5-continued

| | Heat of hydration (cal/g) | | | Setting time (hr–min) | |
|---|---|---|---|---|---|
| Exp. No. | 1 W | 4 W | 13 W | Initial | Final |
| 13 | 31.4 | 43.1 | 49.3 | 3–59 | 5–08 |
| 14 | 36.4 | 48.1 | 57.2 | 3–53 | 5–05 |
| 15 | 45.7 | 63.0 | 70.5 | 3–31 | 4–58 |
| 16 | 47.2 | 69.2 | 75.9 | 3–20 | 4–41 |
| 17 | 53.8 | 79.0 | 88.9 | 3–12 | 4–02 |
| 18 | 25.4 | 37.3 | 40.2 | 3–07 | 4–12 |
| 19 | 24.7 | 35.1 | 39.8 | 3–05 | 4–33 |
| 20 | 25.9 | 36.4 | 41.3 | 2–30 | 3–15 |
| 21 | 55.1 | 70.4 | 81.4 | 2–56 | 5–15 |
| 22 | 75.2 | 86.8 | 99.8 | 2–27 | 3–43 |

TABLE 6

| Experiment No. | 13 | 14 | 15 | 16 | 17 | 18 | 19 | 20 | 21 | 22 |
|---|---|---|---|---|---|---|---|---|---|---|
| Estimated heat of hydration (cal/g) | 42.5 | 46.5 | 60.3 | 62.7 | 68.1 | 36.0 | 34.7 | 35.2 | 66.5 | 79.1 |
| Compressive str./heat of hydration (13 W) | 8.5 | 9.5 | 7.9 | 7.5 | 6.6 | 10.3 | 10.1 | 9.6 | 6.1 | 4.8 |

As comparative examples, moderate heat portland cement (produced by Nihon Cement Co., having a specific surface area of 3420 cm$^2$/g) and ordinary portland cement used as an addition were also tested. The results are given too in Tables 5 and 6. The present invention is represented by Experiment Nos. 13 to 16 and 18 to 20.

EXAMPLE 4

Influences of an addition upon the CaO/SiO$_2$ (molar ratio) and the Al$_2$O$_3$ content of powder compositions were investigated.

The materials described in Example 1 were used in preparing various quenched materials shown in Table 7, which in turn were ground to have a specific surface area of 4500±100 cm$^2$/g. The resulting powders and the ordinary portland cement used in Example 3 were mixed in a ratio of 90 wt. % to 10 wt. % each, thus preparing cement compositions.

These cement compositions were tested for their properties generally in the same way as set out in Example 1. The results are also shown in Table 7. The invention is represented by Experiment Nos. 24 through 27 and 30.

TABLE 7

| | Composition | | Compressive Str. (kgf/cm$^2$) | | | Heat of hydration (cal/g) | | |
|---|---|---|---|---|---|---|---|---|
| Exp. No. | CaO/SiO$_2$ (molar ratio) | Al$_2$O$_3$ (wt %) | 1 W | 4 W | 13 W | 1 W | 4 W | 13 W |
| 23 | 0.50 | 8.0 | not hardened | | | — | — | — |
| 24 | 0.80 | 8.0 | 57 | 225 | 303 | 24.4 | 35.3 | 40.3 |
| 25 | 1.20 | 1.0 | 85 | 281 | 376 | 24.2 | 42.5 | 47.8 |

TABLE 7-continued

| | | | | | | | | |
|---|---|---|---|---|---|---|---|---|
| 26 | 1.20 | 4.0 | 90 | 337 | 572 | 36.0 | 46.2 | 53.0 |
| 27 | 1.20 | 8.0 | 96 | 330 | 558 | 34.4 | 47.1 | 56.2 |
| 28 | 1.20 | 12.0 | 96 | 259 | 368 | 38.2 | 50.7 | 58.7 |
| 29 | 1.20 | 20.0 | 57 | 129 | 190 | 36.5 | 56.5 | 74.2 |
| 30 | 1.50 | 8.0 | 153 | 330 | 487 | 43.2 | 55.7 | 60.6 |

| Exp. | Setting time (hr–min) | | Estimated heat of hydration | Compressive str./heat of hydration |
|---|---|---|---|---|
| No. | Initial | Final | (cal/g) | (13 W) |
| 23 | — | — | — | — |
| 24 | 3–51 | 5–12 | 40.1 | 7.5 |
| 25 | 3–57 | 5–21 | 43.6 | 7.9 |
| 26 | 3–43 | 5–08 | 44.7 | 10.8 |
| 27 | 3–47 | 5–17 | 45.5 | 9.9 |
| 28 | 3–59 | 5–30 | 53.7 | 6.3 |
| 29 | 4–10 | 5–45 | — | 2.6 |
| 30 | 3–51 | 5–07 | 53.6 | 8.0 |

EXAMPLE 5

Property tests of compositions in varied water/cement composition ratios were performed in the following manner.

The quenched material obtained in Experiment No. 11 of Example 2 (with the CaO/SiO$_2$ (molar ratio) of 1.20 and an Al$_2$O$_3$ content of 10.0 wt. %) was ground to a powder having a specific surface area of 3520 cm$^2$/g. The powder was mixed with the ordinary portland cement used in Example 3 in a ratio of 80 wt. % to 20 wt. % to prepare a cement composition. With this cement composition various properties were determined following the procedure of Example 1. Table 8 gives the results. The present invention is represented by Experiment Nos. 31 and 32.

TABLE 8

| Exp. No. | Water cement composition | Compressive Str. (kgf/cm$^2$) | | | Setting time (hr–min) | | Compressive str./heat of hydration (13 W) |
|---|---|---|---|---|---|---|---|
| | | 1 W | 4 W | 13 W | Initial | Final | |
| 31 | 0.65 | 102 | 330 | 540 | 5–44 | 9–04 | 7.8 |
| 32 | 0.45 | 220 | 526 | 851 | 5–44 | 9–04 | 12.3 |

EXAMPLE 6

Cement compositions were prepared from the following industrial materials (with chemical compositions listed in Table 9) and their properties were investigated.

A: Granulated blast-furnace slag, produced by Sumitomo Metal Industries, Ltd., specific surface area 3800 cm$^2$/g.

B: Limestone, produced by Okutama Co., Ltd., specific surface area 2000 cm$^2$/g.

C: Silica stone, from Midou, Saitama Pref., specific surface area 3000 cm$^2$/g.

D: Shale, from Chichibu, Saitama Pref., specific surface area 2000 cm$^2$/g.

E: Rice husk ashes, specific surface area 10000 cm$^2$/g.

F: Aluminous shale, specific surface area 3000 cm$^2$/g.

The above materials were combined and mixed as shown in Table 10, and three different powder compositions were prepared, each having a CaO/SiO$_2$ (molar ratio) of 1.20 and an Al$_2$O$_3$ content of 10.0 wt. %, in the manner described in Example 1. The individual powders were mixed with the ordinary portland cement used in Example 3 in a ratio of 90 wt. % to 10 wt. % to prepare cement compositions. Those cement compositions were tested for their properties by the same methods of Example 1. The results are given in Table 11. (The specific surface areas of the powder compositions are also shown in the same table.) This invention is represented by Experiment Nos. 33 to 35.

TABLE 9

| Raw material | Chemical composition (wt %) | | | | | | | | |
|---|---|---|---|---|---|---|---|---|---|
| | loss | SiO$_2$ | Al$_2$O$_3$ | CaO | MgO | Fe$_2$O$_3$ | R$_2$O | TiO$_2$ | P$_2$O$_5$ | Total |
| A | + | 33.7 | 15.9 | 42.2 | 4.8 | 0.8 | 0.83 | 0.67 | 0.01 | 98.91 |
| B | 43.2 | 1.2 | 0.4 | 54.6 | 0.4 | 0.1 | 0.02 | 0.02 | 0.07 | 100.01 |
| C | 0.8 | 93.5 | 2.5 | 0.2 | 0.4 | 1.3 | 0.87 | 0.09 | 0.07 | 99.73 |
| D | 5.5 | 70.1 | 11.8 | 2.8 | 1.3 | 3.0 | 4.14 | 0.51 | 0.10 | 99.25 |
| E | 6.6 | 77.0 | 0.9 | 4.2 | 1.0 | 0.7 | 3.38 | 0.05 | 2.31 | 96.14 |
| F | 0.3 | 1.6 | 89.9 | 0.2 | 0.1 | 1.2 | 0.07 | 5.83 | 0.06 | 99.26 |

TABLE 10

| Exp. No. | Raw material mixing (part by weight) | | | | | |
|---|---|---|---|---|---|---|
| | A | B | C | D | E | F |
| 33 | 58.1 | 42.0 | 24.0 | — | — | — |
| 34 | — | 84.0 | — | 59.2 | — | 3.0 |
| 35 | — | 82.8 | — | — | 53.7 | 10.2 |

TABLE 11

| Exp. No. | Specific surface area (cm$^2$/g) | Compressive Str. (kgf/cm$^2$) | | | Heat of hydration (cal/g) | | |
|---|---|---|---|---|---|---|---|
| | | 1 W | 4 W | 13 W | 1 W | 4 W | 13 W |
| 33 | 4240 | 83 | 301 | 557 | 32.3 | 47.9 | 56.5 |
| 34 | 4280 | 90 | 332 | 536 | 33.2 | 49.1 | 58.2 |
| 35 | 4320 | 93 | 330 | 548 | 32.8 | 49.2 | 57.1 |

| Exp. No. | Setting time (hr–min) | | Compressive str./heat of hydration (13 W) |
|---|---|---|---|
| | Initial | Final | |
| 33 | 4–02 | 6–27 | 9.9 |
| 34 | 4–11 | 6–33 | 9.2 |
| 35 | 4–15 | 6–29 | 9.6 |

EXAMPLE 7

Investigations were made to see if a flux added to the mixed material obtained during the process of preparing a powder which contains amorphous substances exerts any effect upon the melting point of the mixed material.

Powder compositions (with a $CaO/SiO_2$ (molar ratio) of 1.20, an $Al_2O_3$ content of 10.0 wt. %, and specific surface area of 5000±100 cm$^2$/g) were prepared by the procedure of Example 1, except that a flux ($B_2O_3$) was added to the mixed material of Experiment No. 11 in Example 2 in (additional) proportions shown in Table 12 and that the melting temperature was set at 1500° C. The powder compositions were mixed with the ordinary portland cement used in Example 3 in a ratio of 90 wt. % to 10 wt. % to obtain cement compositions. The properties of the cement compositions were determined generally in conformity with the measuring methods employed in Example 1, and also the melting points of the flux-containing mixed materials were measured. The results are altogether shown in Table 12.

The results indicate that the flux ($B_2O_3$) had no effect whatever on the properties of the cement compositions in amounts up to 5.0 wt. %.

TABLE 12

| Exp. No. | $B_2O_3$ (wt %) (additional) | Melting point (°C.) | Vitrifaction rate (%) | Compressive Str. (kgf/cm$^2$) | | |
|---|---|---|---|---|---|---|
| | | | | 1 W | 4 W | 13 W |
| 36 | 2.5 | 1238 | 98.7 | 81 | 326 | 573 |
| 37 | 5.0 | 1140 | 97.2 | 80 | 322 | 578 |
| 38 | 0.0 | 1326 | 97.9 | 83 | 332 | 567 |

| Exp. No. | Heat of hydration (cal/g) | | | Setting time (hr–min) | | Estimated heat of hydration (cal/g) | Compressive str./ heat of hydration (13 W) |
|---|---|---|---|---|---|---|---|
| | 1 W | 4 W | 13 W | Initial | Final | | |
| 36 | 31.8 | 48.8 | 59.1 | 3–42 | 6–11 | 46.8 | 9.7 |
| 37 | 32.5 | 47.5 | 59.7 | 3–46 | 6–17 | 46.3 | 9.7 |
| 38 | 32.4 | 48.3 | 57.8 | 4–01 | 6–32 | 47.2 | 9.8 |

EXAMPLE 8

A powder composition prepared in the manner to be described below was mixed with additions, and the resulting cement compositions, in the form of pastes, were examined for their properties.

"Calcium carbonate" produced by Hakushin Chemical Laboratory Co., "Hisilica F$_5$" by Nitchitsu Co., and "Fine-particle alumina A-420" by Showa Denko were mixed in a $CaO:SiO_2:Al_2O_3$ ratio by weight of 51:41:8 ($CaO/SiO_2$ (molar ratio)=1.33 and $Al_2O_3$, 8 wt. %). With the addition of polyvinyl alcohol as a binder and ethanol as a solvent, the mixture was pelletized.

The resulting pellets were dried at 100° C. for 24 hours and then calcined at 1000° C. for 30 minutes. The pellets were melted by an electric furnace equipped with a lanthanum chromite heating element at 1700° C. for 30 minutes, and the melt was thrown into an ice-water bath for quenching.

The quenched substance was ground on an iron ball mill to a Blaine's specific surface area of 4000 cm$^2$/g, and a powder composition (with a specific gravity of 2.96) was obtained. This powder composition upon XRD analysis gave no indication of crystalline.

Three different cement compositions (samples) were prepared by mixing thoroughly 10 parts by weight of each of the additions shown in Table 13 with 90 weight-parts portions of the above powder composition. The additions were the ordinary portland cement, anhydrous gypsum, and calcium hydroxide used in Example 3.

To 100 parts by weight of each cement composition thus obtained was added 50 parts by weight of water, and the two were kneaded for 3 minutes to form a paste. A part of it was molded specimens 2 by 2 by 8 cm in size for strength tests, and their compressive strength values were measured at different ages. The remainder was used in measuring the hydration heat values at different ages in conformity with JIS R-5203. Table 13 gives the results. The present invention is represented by Experiment Nos. 39 to 41. The same test was also conducted with a moderate heat portland cement (produced by Nihon Cement Co., 3250 cm$^2$/g).

TABLE 13

| Exp. No. | Addition | Compressive Str. (kgf/cm$^2$) | | |
|---|---|---|---|---|
| | | 1 W | 4 W | 13 W |
| 39 | Ordinary portland cement | 144 | 404 | 560 |
| 40 | Anhydrous gypsum | 244 | 400 | 430 |
| 41 | Calcium hydroxide | 120 | 308 | 380 |
| 42 | Moderate heat portland cement | 148 | 336 | 554 |

| Exp. No. | Heat of hydration (cal/g) | | | Compressive str./heat of hydration (13 W) |
|---|---|---|---|---|
| | 1 W | 4 W | 13 W | |
| 39 | 31.0 | 41.8 | 50.6 | 11.1 |
| 40 | 28.5 | 35.0 | 39.1 | 11.0 |
| 41 | 21.5 | 28.9 | 33.5 | 11.3 |
| 42 | 55.1 | 70.4 | 81.4 | 6.8 |

We claim:

1. A low heat cement composition consisting of:
   from 85 to 99.9 wt. % of a powder composition having an amorphous content of at least 60 wt. %, a $CaO/SiO_2$ molar ratio from 0.8 to 1.5 from 1.0 to less than 12.0 wt. % of $Al_2O_3$ and a fineness of no less than 3000 cm$^2$/g; and
   from 0.1 to 15 wt. % of an added material selected from the group consisting of portland cements, gypsum, sodium hydroxide, sodium carbonate, potassium hydroxide, and mixtures thereof.

2. A composition as claimed in claim 1 wherein the amorphous content is at least 80 wt. %.

3. A composition as claimed in claim 1 wherein the $CaO/SiO_2$ (molar ratio) ranges from 0.9 to 1.4.

4. A composition as claimed in claim 1 wherein the $CaO/SiO_2$ (molar ratio) ranges from 1.0 to 1.3.

5. A composition as claimed in claim 1 wherein the $Al_2O_3$ content ranges from 2 to 8 wt. %.

6. A composition as claimed in claim 1 wherein the $Al_2O_3$ content ranges from 3 to 8 wt. %.

7. A composition as claimed in claim 1 wherein the powder composition has a fineness between 4000 and 10000 cm$^2$/g.

8. A composition as claimed in claim 1 wherein the added material is portland cement.

9. A composition as claimed in claim 1 wherein the mixing ratio of the powder composition and the added material is 85–99.9 wt. % and 0.1–15 wt. %, respectively.

10. A composition as claimed in claim 1 which exhibits a compressive strength to heat of hydration ratio of no less than 7.0 at the age of 13 weeks.

11. A composition as claimed in claim 1 which exhibits a compressive strength to heat of hydration ratio of no less than 8.0 at the age of 13 weeks.

12. The low heat cement composition of claim 1 wherein the added material is selected from the group consisting of ordinary portland cements, high early strength portland cements, moderate heat portland cements, portland blast-furnace slag cements, flyash cements, gypsum dihydrate, gypsum hemihydrate and anhydrous gypsum, and mixtures thereof.

13. A low heat cement composition consisting of:

from 85 to 99.9 wt. % of a powder composition having an amorphous content of at least 60 wt. %, a $CaO/SiO_2$ molar ratio from 0.8 to 1.5 from 1.0 to less than 1.0 wt. % of $Al_2O_3$ and a fineness of no less than 3000 cm$^2$/g; and from 0.1 to 15 wt. % of an added material selected from the group consisting of portland cements, gypsum, sodium hydroxide, sodium carbonate, potassium hydroxide, and mixtures thereof, and which further contains boron oxide, the amount of boron oxide being no greater than 5 wt. %.

14. The low heat cement composition of claim 13 wherein the added material is selected from the group consisting of ordinary portland cements, high early strength portland cements, moderate heat portland cements, portland blast-furnace slag cements, flyash cements, gypsum dihydrate, gypsum hemihydrate and anhydrous gypsum, and mixtures thereof.

* * * * *